United States Patent
Carreel et al.

(10) Patent No.: US 11,338,878 B2
(45) Date of Patent: May 24, 2022

(54) METHOD FOR RECHARGING AN ELECTRICAL ENERGY STORAGE DEVICE STORING ELECTRICAL ENERGY OF A PLURALITY OF VEHICLES

(71) Applicant: BIROTA, Vanves (FR)

(72) Inventors: Eric Carreel, Meudon (FR); Arnaud Le Rodallec, Paris (FR); Pierre Sauvageot, Saint Cyr l'Ecole (FR); Thibault Retiere, Paris (FR); Pierre Barrochin, Paris (FR); Victor Gaillot, Paris (FR); Thomas Molines, Malakoff (FR)

(73) Assignee: BIROTA, Vanves (FR)

( * ) Notice: Subject to any disclaimer, the term of this patent is extended or adjusted under 35 U.S.C. 154(b) by 0 days.

(21) Appl. No.: 16/967,562

(22) PCT Filed: Feb. 13, 2019

(86) PCT No.: PCT/FR2019/050322
§ 371 (c)(1),
(2) Date: Aug. 5, 2020

(87) PCT Pub. No.: WO2019/158860
PCT Pub. Date: Aug. 22, 2019

(65) Prior Publication Data
US 2021/0155106 A1 May 27, 2021

(30) Foreign Application Priority Data
Feb. 13, 2018 (FR) ...................... 18 51195

(51) Int. Cl.
*B62K 3/02* (2006.01)
*B62J 6/01* (2020.01)
(Continued)

(52) U.S. Cl.
CPC ................ *B62K 3/02* (2013.01); *B60L 53/14* (2019.02); *B60L 53/305* (2019.02); *B60L 58/12* (2019.02);
(Continued)

(58) Field of Classification Search
CPC ................ B62K 3/02; B62K 2015/001; B62K 2204/00; B62K 3/002; B60L 53/14;
(Continued)

(56) References Cited

U.S. PATENT DOCUMENTS

| 6,087,806 A | 7/2000 | Fujioka |
| 2008/0297108 A1 | 12/2008 | Le Gars |

(Continued)

FOREIGN PATENT DOCUMENTS

| DE | 10 2007 038 243 A1 | 6/2008 |
| EP | 2 913 260 A1 | 9/2015 |

(Continued)

*Primary Examiner* — Paul Dinh
(74) *Attorney, Agent, or Firm* — Im IP Law; Chai Im; C. Andrew Im

(57) ABSTRACT

A method for recharging an electrical energy storage device of all or some of a plurality connected to the chain. All the vehicles connected to the chain being referred to as the stock. Each vehicle includes an electronic circuit connected to the energy storage device. An electric current flowing between the electronic circuits of at least two consecutive vehicles among the vehicles in the stock recharges the energy storage device or devices.

13 Claims, 12 Drawing Sheets

(51) Int. Cl.
    *B62M 6/90*           (2010.01)
    *B60L 53/14*          (2019.01)
    *B60L 58/12*          (2019.01)
    *B60L 53/30*          (2019.01)
    *H02J 7/00*            (2006.01)
    *B62K 15/00*          (2006.01)

(52) U.S. Cl.
    CPC .................. *B62J 6/01* (2020.02); *B62M 6/90*
    (2013.01); *H02J 7/0013* (2013.01); *H02J*
    *7/00032* (2020.01); *H02J 7/0042* (2013.01);
    *H02J 7/0048* (2020.01); *B60L 2200/12*
    (2013.01); *B62K 2015/001* (2013.01)

(58) Field of Classification Search
    CPC .... B60L 58/12; B60L 53/305; B60L 2200/12;
             B60L 53/22; B60L 53/31; B60L 2260/22;
             B60L 53/16; B60L 50/20; H02J 7/00032;
             H02J 7/0048; H02J 7/0013; H02J 7/0042;
             H02J 2310/40; B62J 6/01; B62M 6/90;
             B62M 6/45; Y02T 90/16; Y02T 10/70;
             Y02T 10/7072; Y02T 90/12; Y02T 90/14;
             B62H 2003/005; B62H 3/00

USPC ........................................................ 320/109
See application file for complete search history.

(56) References Cited

U.S. PATENT DOCUMENTS

| | | | |
|---|---|---|---|
| 2010/0228405 A1* | 9/2010 | Morgal | B60L 53/68 |
| | | | 701/2 |
| 2012/0005031 A1 | 1/2012 | Jammer | |
| 2015/0357837 A1* | 12/2015 | Takai | H02J 7/0013 |
| | | | 320/107 |
| 2017/0364995 A1 | 12/2017 | Yan | |
| 2020/0223507 A1 | 7/2020 | Le Rodallec et al. | |
| 2021/0237597 A1* | 8/2021 | Bowman | B60L 53/34 |

FOREIGN PATENT DOCUMENTS

| | | |
|---|---|---|
| EP | 2 955 092 A1 | 12/2015 |
| FR | 2 883 090 A1 | 9/2006 |
| JP | H11 285109 A | 10/1999 |
| KR | 2011 0007553 A | 1/2011 |
| WO | 2012/107448 A1 | 8/2012 |
| WO | 2019/063948 A2 | 4/2019 |
| WO | 2019/135043 A1 | 7/2019 |

* cited by examiner

METHOD FOR RECHARGING AN ELECTRICAL ENERGY STORAGE DEVICE STORING ELECTRICAL ENERGY OF A PLURALITY OF VEHICLES

RELATED APPLICATIONS

This application is a § 371 application of PCT/FR2019/050322 filed Feb. 13, 2019, which claims priority from French Patent Application No. 18 51195 filed Feb. 13, 2018, each of which is incorporated herein by reference in its entirety.

TECHNICAL FIELD OF THE INVENTION

The field of the invention is that of electrical systems.

More precisely, the invention relates to a method for recharging an electrical energy storage device for a plurality of vehicles.

The invention finds in particular applications for recharging batteries of electric vehicles such as electrically assisted bicycles or electric scooters.

BACKGROUND OF THE INVENTION

Techniques for recharging batteries of a fleet of electric vehicles by installing in particular individual terminals for each vehicle in the fleet are known from the prior art.

The main drawback of installing these individual terminals is requiring the installation of a multitude of fixed terminals, which involves monopolizing a large surface area for recharging the fleet. Furthermore, since each terminal is supplied with current, installing a multitude of fixed terminals is lengthy and tedious.

In order to improve the establishment of the recharging system, there exist techniques for recharging batteries for a plurality of vehicles by connecting each to a single terminal.

However, the drawback of these systems is that recharging the batteries of the vehicles in the fleet is lengthy and tedious in order to allow an individual to use a vehicle with a sufficient battery level, conferring an acceptable range for use of the vehicle.

None of the current systems makes it possible to respond simultaneously to all the requirements, namely offering a technique that makes it possible to recharge a fleet of vehicles in a clever way, while minimizing the operations of establishing and maintaining the recharging system.

SUMMARY AND OBJECT OF THE INVENTION

The present invention aims to remedy all or some of the drawbacks of the prior art cited above.

To this end, the present invention relates to a method for recharging an electrical energy storage device for all or some of a plurality of vehicles connected to the chain, all the vehicles connected to the chain being referred to as the stock, each vehicle comprising an electronic circuit connected to said energy storage device.

In other words, the vehicles are connected in series to one another.

The vehicles in the stock are generally similar or even identical.

Such vehicles may in particular be a vehicle for human propulsion such as a bicycle, also referred to as a bike, a tricycle, a scooter, a pedal car, a pedalo, etc. Generally, the human propulsion is provided by a pedaling device used by an individual, the pedaling device generally comprising two cranks rotating the drive shaft.

The vehicles are in particular electric insofar as they generally comprise an electrical device assisting propulsion and comprising an electrical energy storage device, which may also be termed a battery.

The vehicles may also be electric kick scooters. Such a kick scooter is generally for human propulsion insofar as an electric kick scooter can be propelled by an individual using one of his legs to move the kick scooter by pushing on the ground with the associated foot. In particular, some models require such a human thrust in order to "initiate" the start-up of the electric device assisting propulsion.

According to the invention, the recharging of the energy storage device or devices is done by means of an electric current circulating between the electronic circuits of at least two consecutive vehicles among the vehicles in the stock.

Thus, the transfer of energy takes place gradually between each vehicle in the stock. This recharging method is in particular useful for recharging the batteries of a plurality of vehicles stored compactly, as described in the international patent applications filed under the numbers PCT/FR2018/052385 and PCT/FR2018/053519.

Advantageously, the electronic circuits are connected in series.

In particular embodiments of the invention, the recharging method comprises a step of automatic selection of at least one electrical energy storage device to be charged, according to the position of the vehicles with respect to a reference vehicle in the stock and according to the state of charge of the electrical energy storage device of each vehicle.

Thus the recharging of the energy storage devices is prioritized so that an individual can take and use a vehicle in the stock with sufficient energy.

It must be emphasized that an individual generally begins to take a vehicle situated at a free end of the stock, the other vehicles not generally being able to be disconnected alone.

The reference vehicle may in particular be a vehicle situated at one of the two ends of the stock.

In particular embodiments of the invention, each vehicle comprises a coupling set comprising attachment means and complementary attachment means, the attachment means being able to be coupled to complementary attachment means presented by a similar second vehicle or by a terminal, the vehicles in the stock being coupled to one another, the attachment means and the complementary attachment means each comprising complementary electrical connection means, able to electrically connect said vehicle with the second vehicle or with the terminal.

In particular embodiments of the invention, the vehicles also each comprise an electronic module, the method also comprising steps of:
  determination of a so-called "master" electronic module among the electronic modules included in the vehicles in the stock;
  communication to the master module of the list of vehicles in the stock and the state of the electrical energy storage device of each vehicle in the stock.
  communication by the master module of a command to the module of each vehicle in the stock in order to connect the selected electrical energy storage device or devices to a charging circuit connected to the power supply, the other electrical energy storage devices in the stock being disconnected from the charging circuit;
  recharging of the electrical energy storage devices selected.

In particular embodiments of the invention, the method also comprises a step of communicating to the master module the position of the vehicles in the stock with respect to a reference element that is a vehicle in the stock or the terminal.

In particular embodiments of the invention, the method also comprises steps of:
- communicating to the master module at least one neighbor for each vehicle in the stock;
- determining the position of the vehicles in the stock with respect to a reference element that is a vehicle in the stock or the terminal.

In particular embodiments of the invention, wherein the selection of the electrical energy storage device or devices to be charged is restricted to a predetermined number, said selection comprising the electrical energy storage device or devices having a charge level below a predetermined threshold, among the electrical energy storage devices of the vehicles in the stock situated at a predetermined distance from one end of the stock, said end corresponding to the reference vehicle in the stock.

In particular embodiments of the invention, the stock is connected to a terminal connected to an electrical supply via a vehicle in the stock, the terminal comprising an electronic module and the master module being determined from among the electronic modules included in the vehicles in the stock or in the terminal.

In particular embodiments of the invention, the method also comprises steps of:
- detecting a modification of the number of vehicles in the stock;
- updating the selection of the electrical energy storage device or devices to be charged.

In particular embodiments of the invention, the electronic module of a first vehicle in the stock detects the coupling of a second vehicle in the stock to one of the attachment means of the first vehicle, identifies the second vehicle and establishes a communication network with the second vehicle.

It must be emphasized that the communication network may be wireless, for example in accordance with the Wi-Fi or Bluetooth® format, or be of the "power line" (PL) type.

In particular embodiments of the invention, the communications are made via a wireless communication protocol such as Bluetooth® Low Energy (BLE) or Wi-Fi.

In particular embodiments of the invention, the vehicle is an electric bicycle or a vehicle scooter, said vehicle comprising a device assisting propulsion of the vehicle.

BRIEF DESCRIPTION OF THE FIGURES

Other particular advantages, aims and features of the present invention will emerge from the following non-limitative description of at least one particular embodiment of the devices and methods that are objects of the present invention, with regard to the accompanying drawings, wherein.

DETAILED DESCRIPTION OF EMBODIMENTS OF THE INVENTION

The present invention is given non-limitatively, each feature of an embodiment being able to be combined with any other feature of any other embodiment advantageously.

It is now noted that the figures are not to scale.

Example of a Particular Embodiment of the Invention

Figure 1:
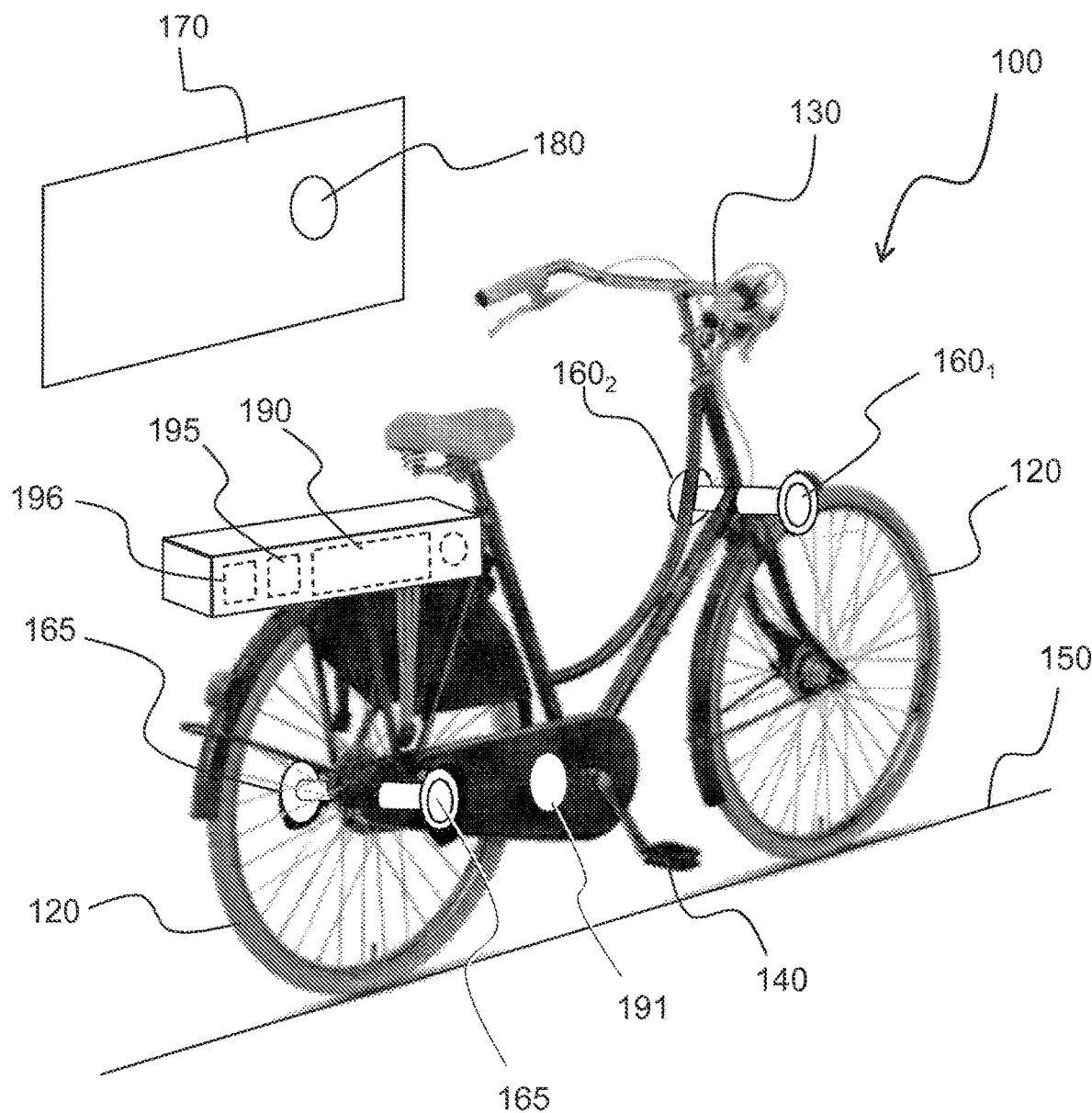
FIG. 1 depicts a view of a vehicle that is the object of a recharging method according to the invention.

FIG. 1 depicts a human-propulsion vehicle 100, normally known by the name bicycle. The vehicle 100, comprising in particular a tubular frame 110, two wheels 120, handlebars 130 and pedals 140, is referred to as a bicycle 100 in the remainder of the description. The structure of the vehicle 100 is consequently, in the present non-limitative example of the invention, the frame 110 of the bicycle 100.

It must be emphasized that the bicycle 100 moves along a longitudinal axis 150 when the wheels 120 are parallel.

The frame of the bicycle 100 is substantially symmetrical with respect to a midplane 151 parallel to the longitudinal axis 150, the midplane 151 generally comprising the two wheels 120 when they are parallel.

The bicycle 100 has laterally, on each side, offset by a defined distance with respect to the midplane 151, a front attachment zone 160 and an attachment zone 165 situated at the rear of the bicycle 100.

It must be emphasized that the attachment zone $160_1$, on one side of the bicycle 100, is advantageously complementary to the attachment zone $160_2$ on the other side of the bicycle 100.

In other words, the bicycle 100 comprises two coupling sets, one at the front of the bicycle 100 and the other at the rear of the bicycle 100, the front coupling set comprising an attachment zone $160_1$ and a complementary attachment zone $160_2$, the rear coupling set comprising an attachment zone $165_1$ and a complementary attachment zone $165_2$.

In variants of this particular embodiment of the invention, the bicycle 100 comprises only one coupling set, preferably in the vicinity of the front of the bicycle 100, comprising an attachment zone and a complementary attachment zone.

In the present non-limitative example of the invention, the two front attachment zones 160 are substantially vertically in line with the rotation axis of the front wheel $120_A$, while the two rear attachment zones 165 are substantially in the rotation axis of the rear wheel 120B.

The zones 160, 165 make it possible to hold the bicycle 100 on a device 170 having at least one attachment zone 180 complementary to one of the zones 160 or 165. The bicycle 100 is generally held on the device 170 using a magnetic attraction force, through the presence of a magnet, permanent or not. An electromagnet may be provided in order to create a magnetic counterforce in order to more easily detach the bicycle 100.

In order to trigger the electromagnet, a device indicating the gripping of the bicycle 100 by a user may advantageously be included in the bicycle 100. This gripping-detection device may for example be placed on the handlebars 130 of the bicycle 100 in order to trigger, by means of an accelerometer, a movement of the handlebars 130.

The device 170 may in particular be a fixed terminal or another bicycle similar or even identical to the bicycle 100.

This is because the attachment zones 160 and 165 present on one side, for example on the left-hand side of the bicycle 100, have a form and/or a polarity complementary to the facing attachment zones 160 and 165, on the other side, for example on the right-hand side of the bicycle 100.

It must be emphasized that two attachment zones 160 and the two attachment zones 165 are positioned laterally in a plane perpendicular to the longitudinal axis 150, in order to allow storage of the bicycles 100 in a line perpendicularly to the axis 150. The attachment zones 160 and 165 generally have a flat face parallel to the longitudinal axis 150, each flat face being able to come into contact with a flat face presented by the attachment zone 180.

The bicycle 100 also comprises a battery 190 connected to an electric device assisting the pedaling 191, and an electronic module 195 comprising a microprocessor, a computer memory and a wireless communication device 196. The wireless communication device 196 is based for example on a Wi-Fi protocol, on a Bluetooth Low Energy® (BLE) protocol, or on any other protocol well known to a person skilled in the art. The electronic module 195 may also be called a microcontroller.

Figure 2:
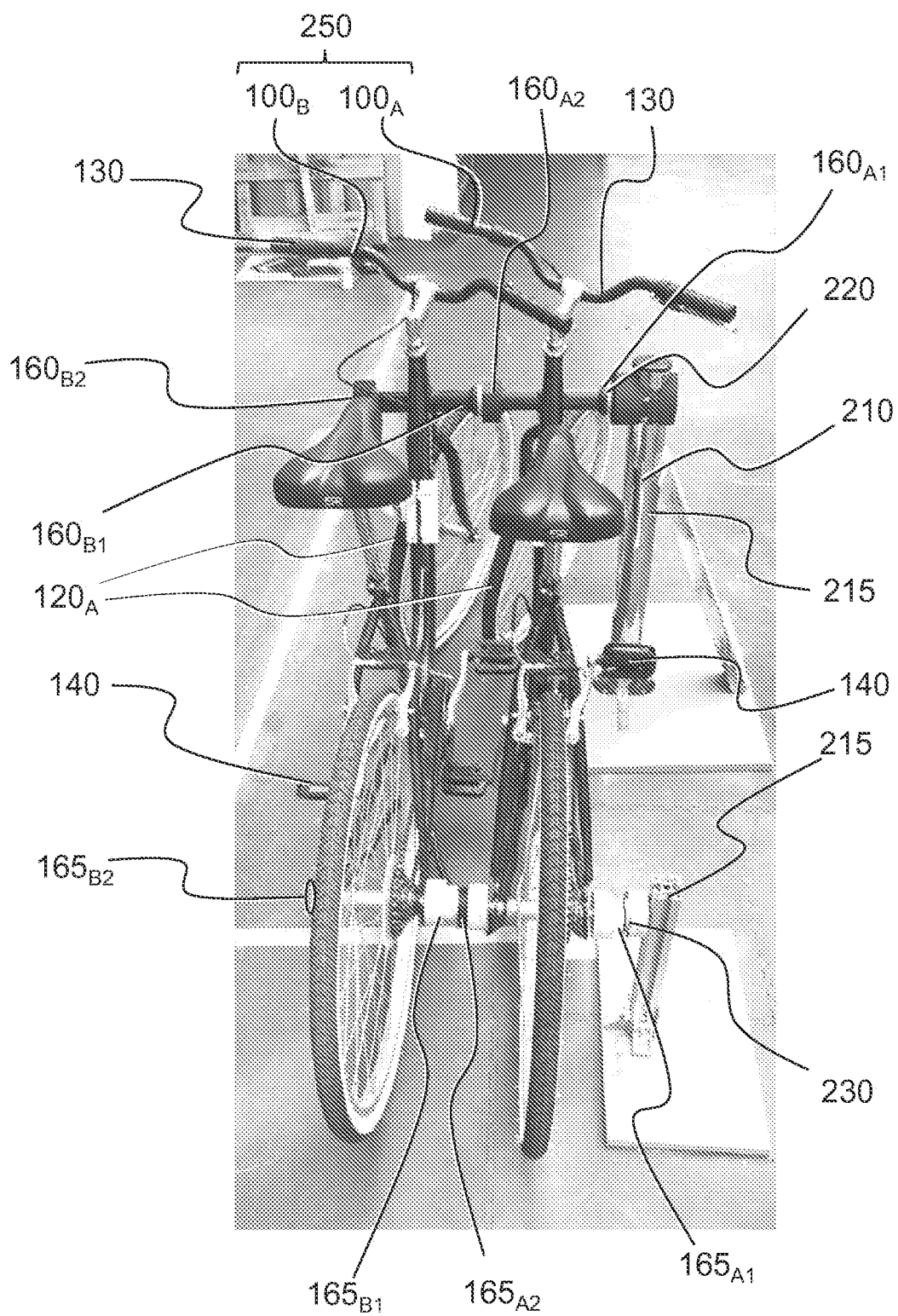
FIG. 2 is a view of the vehicle storage in FIG. 1.

FIG. 2 illustrates the storage of two bicycles 100 at a terminal 210 comprising two masts 215.

The terminal 210 has a zone 220 on which is held by magnetization on the zone $160_{A1}$ on the right-hand side of the first bicycle $100_A$ and a zone 230 on which is held by magnetization on the zone $165_{A1}$ on the right-hand side of the first bicycle $100_A$.

In variants of this particular embodiment of the invention, the terminal 210 also comprises an electronic module comprising a microprocessor, a computer memory and a wireless communication device. The electronic module of the terminal is generally similar to the electronic module 195 of the bicycle 100.

The second bicycle $100_B$ is next positioned on the first bicycle 100. In order to hold the second bicycle $100_B$ on the first bicycle $100_A$, the attachment zone $160_{B1}$ on the right-hand side of the second bicycle $100_B$ is held by magnetization on the zone $160_{A2}$ on the left-hand side of the first bicycle $100_A$.

The attachment zones $160_{B2}$ $165_{B2}$ on the left of the bicycle 100 are free for attachment of another bicycle.

A user wishing to use a bicycle 100 in the stock 250 takes the first available bicycle 100, namely the one that is opposite to the terminal 210.

Figure 3:
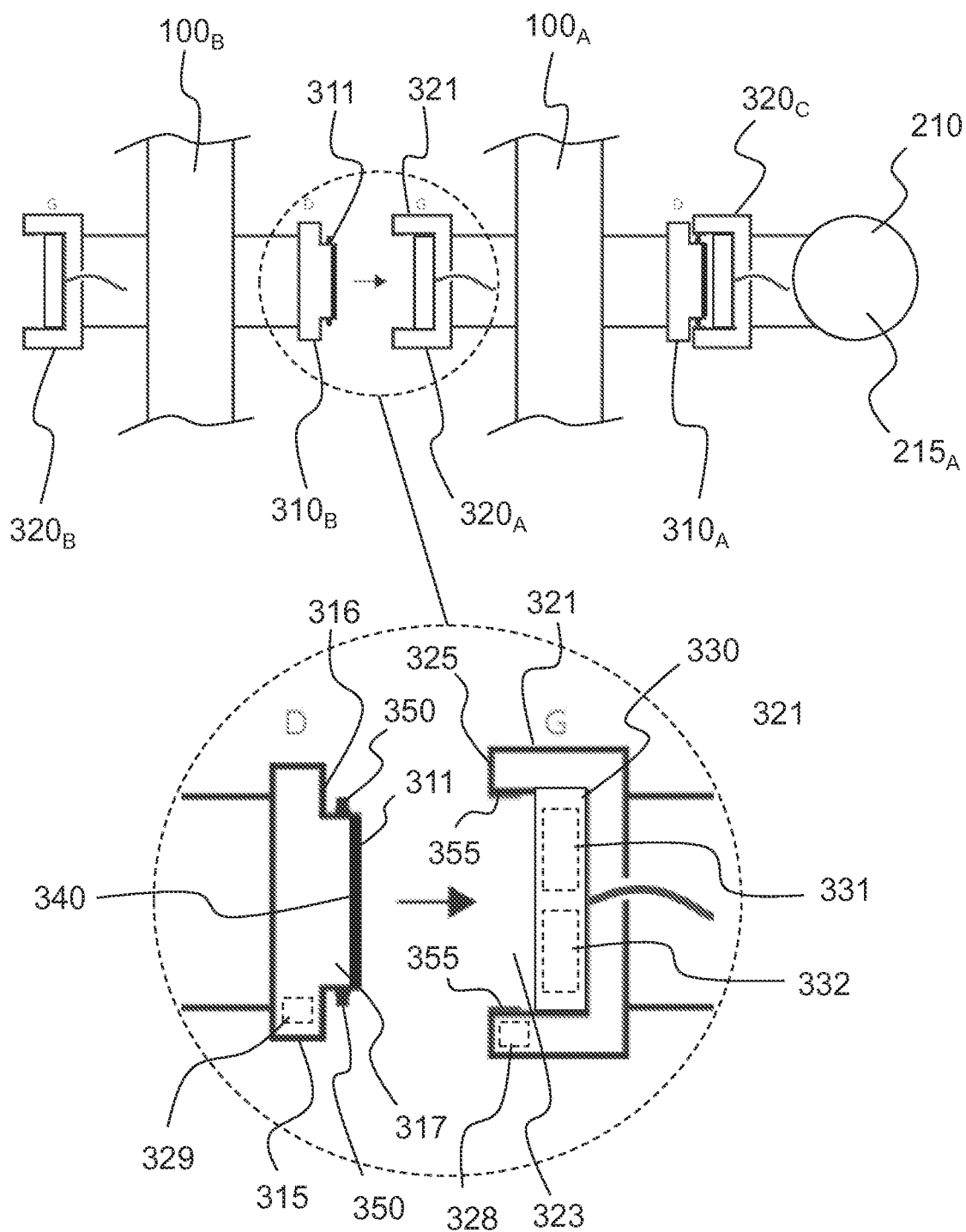
FIG. 3 is a schematic view in cross section of the vehicle storage in FIG. 2, illustrating the means of coupling between two vehicles.

FIG. 3 is a schematic view showing in detail an example of a mechanism for coupling between two front attachment zones 160, namely between an attachment zone 310 and a complementary attachment zone 320.

FIG. 3 thus presents a terminal 210 and two identical bicycles 100. The bicycle $100_A$ is coupled to the terminal 210 by means of a front attachment zone $310_A$, situated, in the present non-limitative example of the invention, to the right of the bicycle $100_A$, and by means of a complementary attachment zone $320_C$ fixed to the mast $215_A$ of the terminal 210.

The bicycle $100_A$ also comprises a complementary attachment zone $320_A$, situated on its left-hand side, and intended to be coupled with an attachment zone $310_B$ of the bicycle $100_B$.

It must be emphasized that a device of any nature may come to be coupled to the stock 250 insofar as it has at least one attachment zone 310 or at least one complementary attachment zone 320.

The attachment zone 310 has a male element 311 engaging with a female element 321 of a front attachment zone 320.

The male element 311 of the attachment zone 310 is configured, in the present non-limitative example of the invention, by a cylindrical piece 315 comprising a shoulder 316 surrounding a cylindrical protrusion 317. The shoulder 316 is intended to come into abutment on the female element 321, which comprises an oblong shaped recess configuring a housing 323 in which the cylindrical protrusion 317 presented by the male element 311 is inserted.

It must be emphasized that the shape of the recess is advantageously oblong in the vertical direction in order to overcome any irregularities on the ground on which the bicycles $100_A$, $100_B$ and the terminal 210 are resting, offering a degree of vertical freedom, the width of the oblong shape being substantially greater than the diameter of the protrusion 317.

Thus, the male element 311 can be fixed at various heights, with a vertical freedom of around 10 millimeters with respect to the center of the housing 323.

Each bicycle 100 comprises an identification entered in an NFC (the acronym for near field communication) tag 328 included in the female element 321, as well as an NFC reader 329 included in the male element 311 able to read the NFC tag 328 of an adjoining bicycle 100.

In order to keep the two attachment zones 310 and 320 in contact, an electromagnetic sucker 330 fixed to the bottom of the housing 323 engages with a steel plate 340 fixed at the flat end of the protrusion 317.

Thus, when the protrusion 317 is inserted in the housing 323, the attachment zone 310 is attracted by the magnetic force exerted by the magnetic sucker 330 on the plate 340.

The electromagnetic sucker 330 comprises a permanent magnet 331 and a coil 332 which, when it is powered, creates a magnetic counterfield reducing or neutralizing the magnetic field of the magnet 331, in order to make it possible to more easily uncouple two attachment zones 310 and 320.

It must be emphasized that the electromagnetic sucker 330 is advantageously recessed in the female element 321, instead of being placed on the male element 311, thus reducing the risk of unwanted magnetization of metal elements situated in the vicinity of the sucker 330.

In variants of this particular embodiment of the invention, the magnetic sucker comprises a permanent magnet and a mechanism for moving the magnet between a closed position and a position distant from the external surface 325, the distant position conferring a lesser magnetization force than in the near position.

When the attachment zones 310 and 320 are in contact, the shoulder 316 is in abutment on the external surface 325, and an electrical connection is established between the two attachment zones 310 and 320 by means of two connectors 350 radially projecting on the periphery of the protrusion 317.

For establishing the electrical connection, the two connectors 350, diametrically opposed horizontally, are in contact with two plates 355 presented by the vertical flat faces of the oblong shaped housing 323. Thus, the electrical contact is provided whatever the coupling height between the attachment zones 310 and 320.

Advantageously, the connectors 350 comprise a spring in order to provide the electrical contact between the connectors 350 and the plates 355. The spring also takes up any difference in distance that may appear if the axis formed by the two connectors 350 is inclined with respect to the tangent to the plates 355, which may be the case when the ground comprises roughness. The maximum permissible angle is generally around 5° to 10°.

It must be emphasized that, for each bicycle 350, each connector 350 is connected to a plate 355 in order to electrically connect all the bicycles 100 in the stock 250 while producing an electrical circuit, referred to as the charging circuit, which is generally supplied by a DC charging voltage.

Figure 3B:
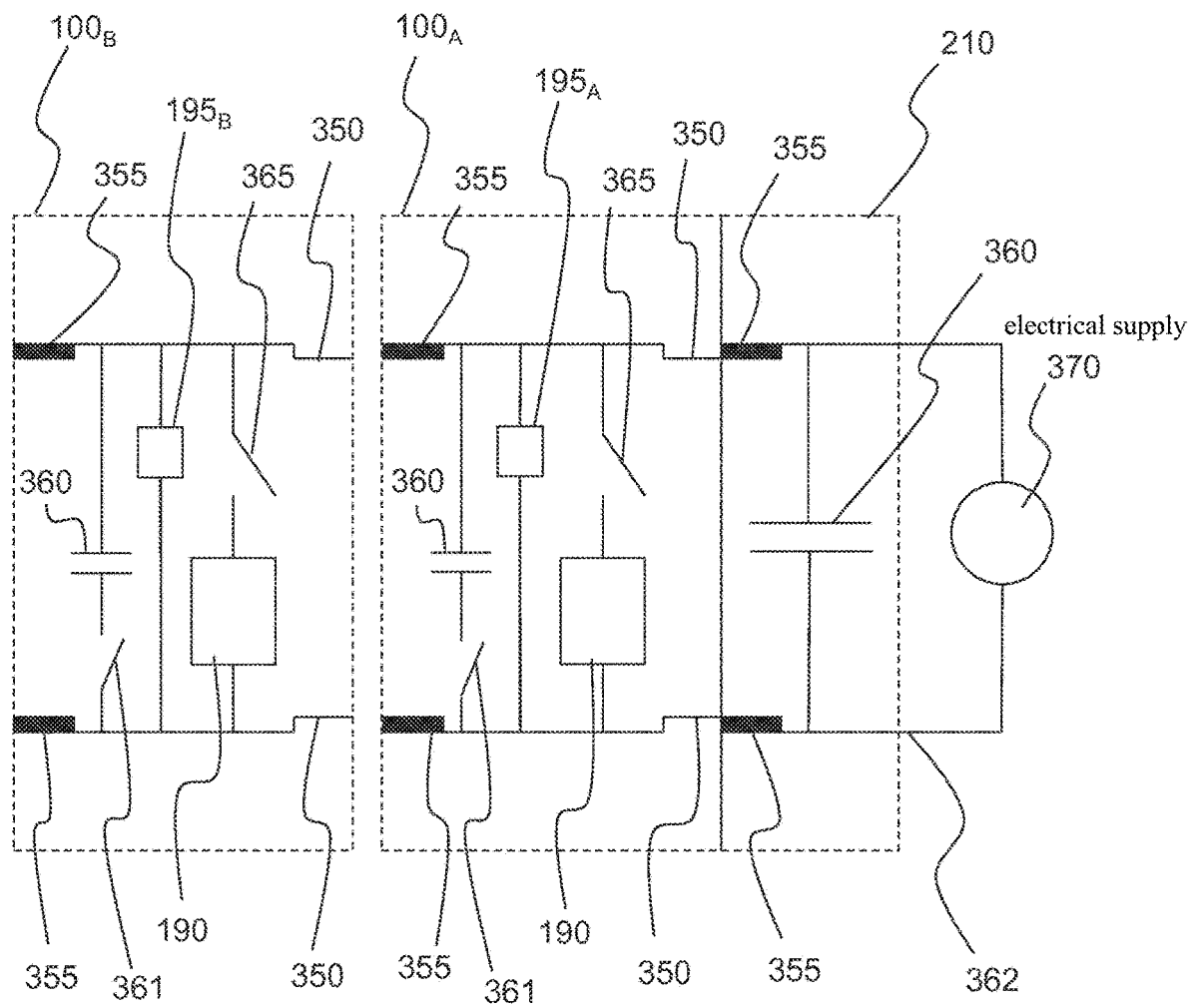
FIG. 3B is a simplified electrical diagram of the vehicle storage in FIG. 2.

FIG. 3B depicts a simplified electrical diagram of the bicycles $100_A$ and $100_B$ and of the terminal 210. This electrical diagram comprises the charging circuit 362 connecting each battery 190 in parallel.

In order to connect or disconnect each battery 190 to and from the charging circuit, a switch 365 connects each battery 190 to the charging circuit 362.

The charging circuit 362 is supplied by an electrical supply source 370, which is for example an electrical network, an electricity generator or an electric battery, and which generally delivers a DC voltage current. The charging circuit 362 ends in two plates 355 free for a connection to another bicycle 100.

In order to be able to determine whether the electrical connection is indeed established during coupling, the plates 355 of each complementary coupling zone 320 are connected together by means of a capacitor 360. It must be emphasized that the charging voltage is generally DC, and the capacitor 360 does not short-circuit the charging circuit 362.

When the bicycle $100_B$ is coupled to the bicycle $100_A$, an AC voltage signal is sent by the electronic module 195 of the bicycle $100_B$, connected in parallel to the charging circuit 362, and circulates in the charging circuit 362, being superimposed on the DC charging voltage.

It must be emphasized that the electronic module 195 advantageously comprises electronic protection means (not shown in the figure) preventing the electronic module 195 being damaged by the charging current circulating in the circuit 362.

The alternating signal circulating through the capacitor of the bicycle $100_B$, the electrical circuit thus being closed even if the batteries 190 are not connected to the charging circuit 362, the electronic module of the bicycle $100_B$ thus has the information that the electrical contact is indeed made between the two bicycles $100_A$ and $100_B$. The electronic module of the bicycle $100_B$ can then send an audible or visual signal to the outside of the bicycle $100_B$, visible to an individual.

It must be emphasized that the circulation of the alternating signal does not require the stock 250 to be connected to the terminal 210 or for the terminal 210 to be connected to the electrical supply source 370. In other words, it is possible to confirm the coupling between two bicycles 100 without any of the bicycles being coupled to the terminal 210 or when the terminal 210 is not supplied with current by a power supply source.

Furthermore, in order to avoid the electronic module 195 of a bicycle 100 indicating that the bicycle 100 is coupled with a similar bicycle 100 or with the terminal 210 when the bicycle 100 is free, a switch 361 is associated with the capacitor 360 of each bicycle 100. To this end, the switch 361 is open when the bicycle 100 is free. When the bicycle 100 is coupled, for example to the stock 250, the switch 361 of said bicycle 100 is closed as soon as the electronic module 195 detects coupling by the establishment of the electrical connection with the stock 250.

As soon as the bicycle $100_B$ is coupled with the bicycle $100_A$, an alternating signal sent by the electronic module $195_B$ can circulate in the electrical circuit closed by at least the capacitor 360 of the terminal 210 or of the bicycle $100_A$.

When the electrical connection is established successively between each bicycle 100 of the stock 250, the electrical connection can in particular serve to recharge the battery 190 of all or some of the bicycles 100 connected to the terminal 210.

To this end, an electric charging current circulates through all or some of the bicycles 100 in the stock 250.

Because the terminal 210 generally has limited available electrical power, a clever recharging strategy may be established in order to privilege the recharging of the battery 190 of one or more bicycles from among the bicycles 100 attached to the terminal 210.

Figure 4:
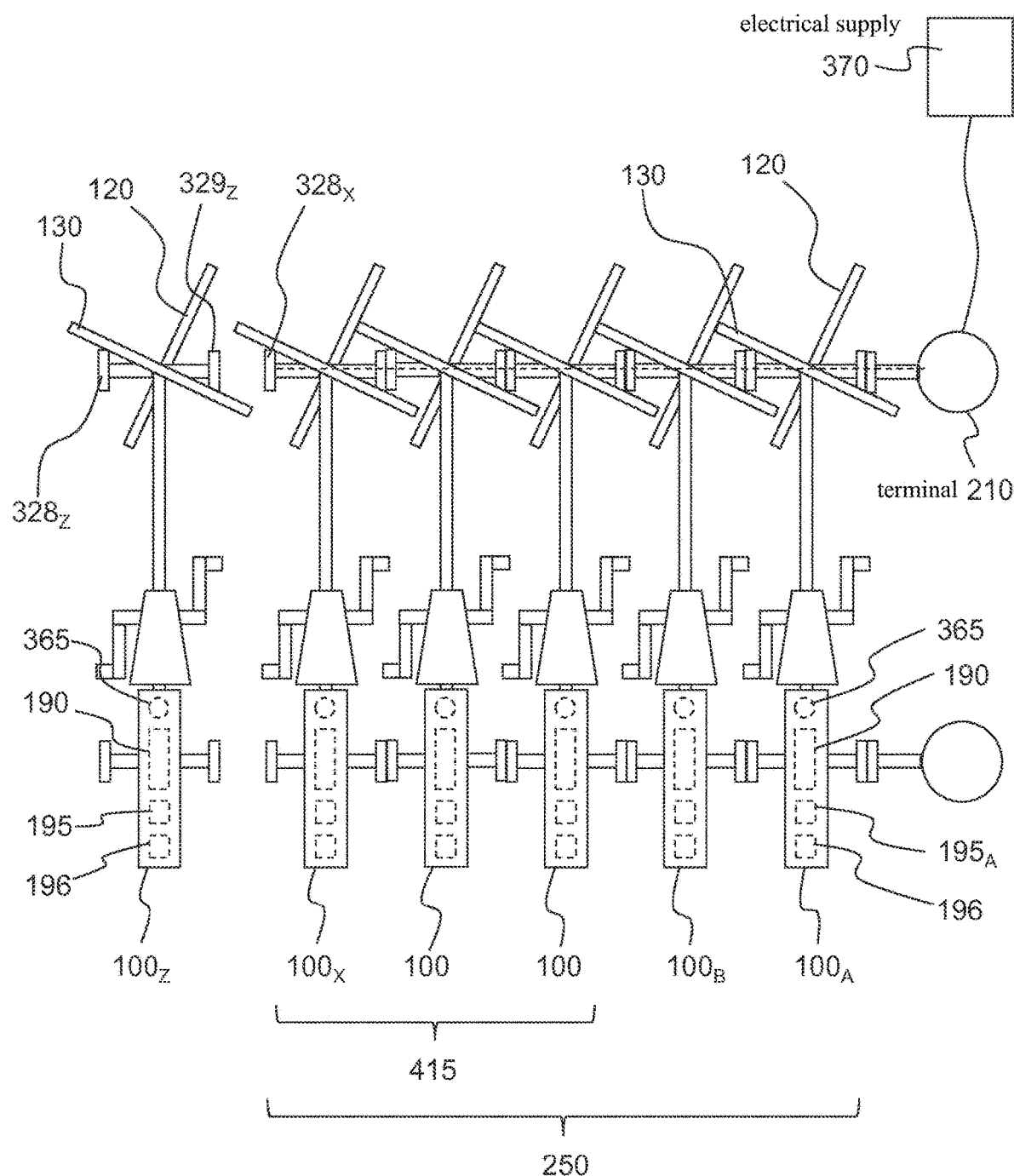
FIG. 4 is a plan view of a stock of vehicles in FIG. 1.

As illustrated in FIG. 4, a recharging strategy is for example to recharge the bicycle 100x situated at the free end of the stock 250 as a priority, or even a plurality of bicycles 100 situated in the vicinity of a free end of the stock 250, included for example in the batch 415 comprising the three bicycles situated at the end of the free end of the stock 250. Among the batch 415, it may be chosen preferentially to recharge those having the batteries having a lower energy level than the others, or having an energy level below a predetermined threshold.

In order to manage the recharging strategy, the module 195 of the bicycle $100_A$ attached to the terminal 210 serves as "master" and sends a command to the modules 195 of each bicycle 100 of the stock 250 indicating either to connect or disconnect the battery 190 to or from the charging line. To this end, an electrical switch 365, able to be controlled remotely, is inserted in the electrical circuit connecting the battery 190 of each bicycle 100 to the charging circuit.

It must be emphasized that, when the bicycle 100z is coupled to the bicycle 100x situated at the free end of the stock 250, the NFC reader 329z reads the NFC tag 328x of the bicycle 100x comprising the list of identifiers of the stock 250, including the bicycles 100 and the terminal 205, and updates the NFC tag 328z by adding to the list the identifier of the bicycle 100z.

The list may also comprise an indication of the state of the battery of each bicycle 100.

The list may then be communicated to the module $195_A$ of the "master" bicycle $100_A$ or to a remote server managing the fleet of bicycles 100, by means for example of a wireless telecommunication device, comprising for example a 3G antenna, installed either on a bicycle 100 or on the terminal 205.

When the module $195_A$ of the bicycle $100_A$ receives the list of bicycles 100 and of the states of the batteries 190 thereof, the module $195_A$ processes the data in order to determine which are the batteries 190 to be charged as a priority in order to optimize the recharging time thereof and to enable a user to have more chance of being able to take a bicycle 100 situated at the free end of the stock 250 and to profit from the electrical assistance with pedaling, the battery 190 of the bicycle 100 used having previously been recharged.

The module $195_A$ sends, by means of the wireless communication device 425, to each bicycle 100, a command indicating the opening or closing of the switch 365 of each bicycle 100 in order to connect only the batteries 190 selected, with a view to recharging them.

The selected batteries 190, once connected to the charging circuit, are then recharged by means of the electric charging current circulating in the charging circuit through all or some of the bicycles 100 in the stock 250.

Figure 5:
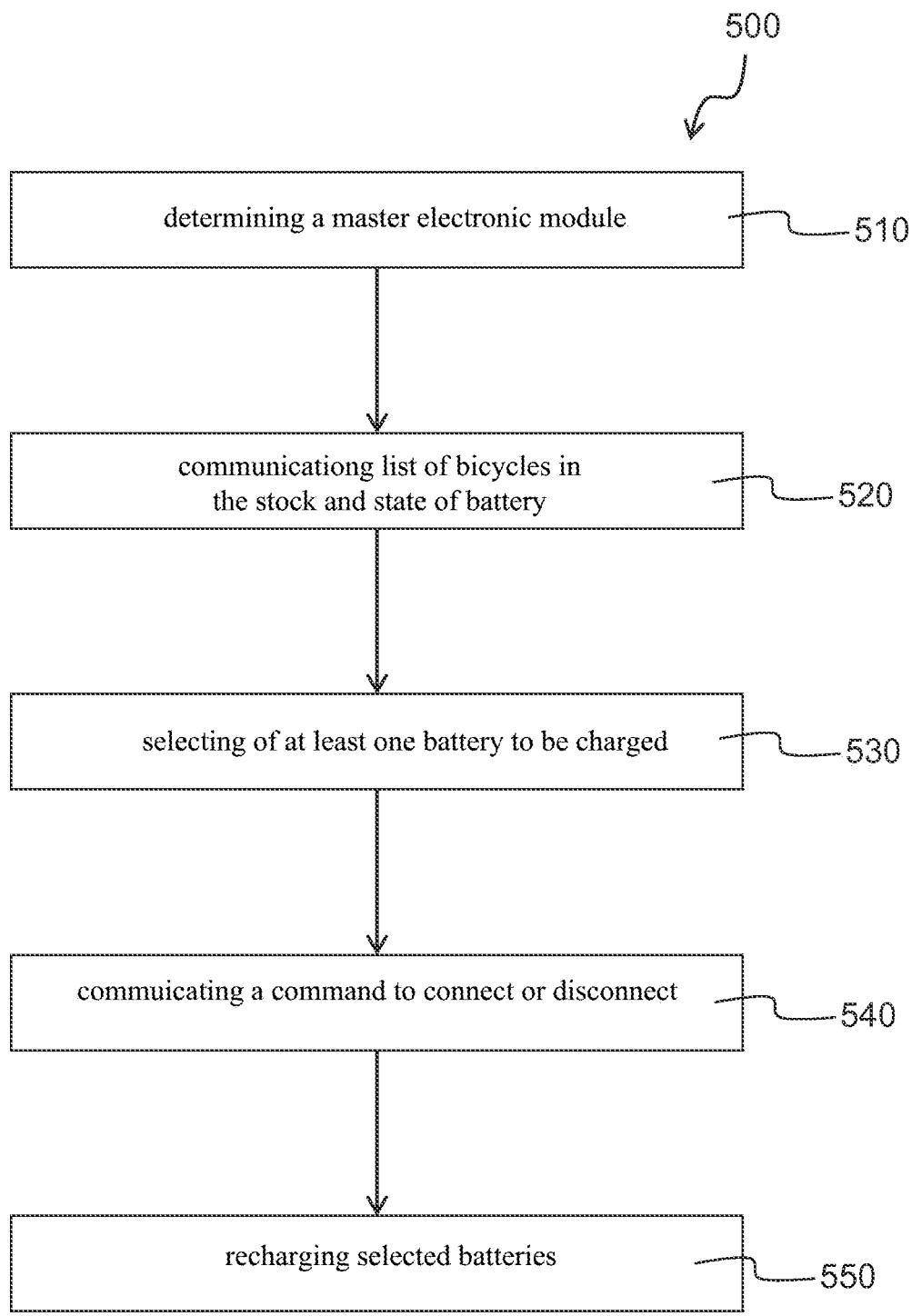
FIG. 5 is a block diagram of a method for recharging all or part of the stock in FIG. 4.

FIG. 5 depicts, in the form of a block diagram, the method 500 for recharging a battery 190 of all or some of the bicycles 100 in the stock 250 coupled to the terminal 210.

The method 500 comprises a first step 510 of determining a "master" electronic module among the bicycles 100 in the stock 250. The "master" electronic module corresponds, in the present non-limitative example of the invention, to the electronic module 195 of the bicycle $100_A$. The module $195_A$ will thus receive the information concerning the stock 250 in order to control the recharging of all or some of the batteries 190 in the stock 250.

The second step of the method 500 is a step 520 of communicating, to the "master" module $195_A$, the list of bicycles 100 in the stock 250 and the state of the battery 190 thereof.

From this list, a selection of at least one battery 190 to be charged is made, during a third step 530, from the state of charge of the batteries 190 and the proximity thereof to the free end of the stock 250.

In the present non-limitative example of the invention, the selection comprises two batteries 190 having a charge level below a predetermined threshold, among the batteries in the batch 415.

From the list of batteries selected, a command is next communicated by the module $195_A$ of the bicycle $100_A$ to each bicycle 100 in the stock 250 during a fourth step 540. The command communicated to a given bicycle 100 indicates whether the battery 190 of said bicycle must be connected to the charging circuit 362 or whether it must be disconnected. The command consequently results in a closing or opening of the switch 365 associated with said battery 190.

The batteries 190 selected are next recharged during the fifth step 550.

Other Example of an Embodiment of the Invention

Figure 6:
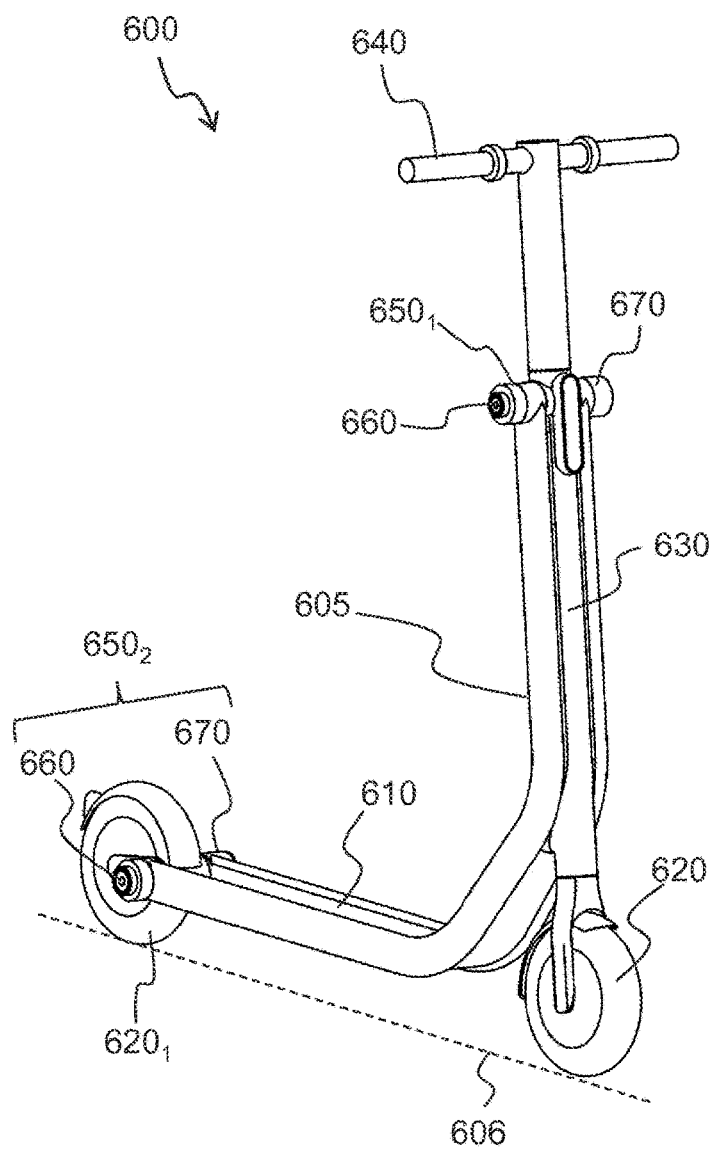
FIG. 6 is a perspective view of another vehicle that is the object of a recharging method according to the invention.
Figure 7:
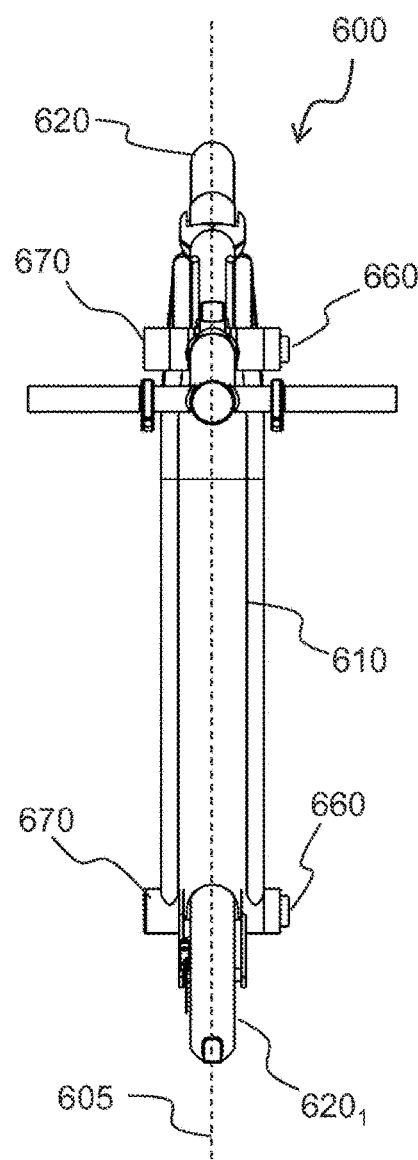
FIG. 7 is a plan view of the vehicle in FIG. 6.

FIGS. 6 and 7 illustrate a structure 605 of a kick scooter 600, respectively in a perspective view and a plan view.

The structure 605, normally referred to by the English term deck, comprises a platform 610 and a stem 630.

In order to form the kick scooter 600, the structure 605 is assembled with two wheels 620 and handlebars 640.

As can be seen in FIG. 7, it is necessary to emphasize that the structure 605 of the scooter 600 is substantially symmetrical along a longitudinal midplane 605. The longitudinal midplane 605 is generally vertical when the scooter 600 is propelled along the normal movement axis 606, corresponding to the parallel wheels 620.

In order to be able to form a compact storage, the structure 605 of the scooter 600 comprises two coupling sets 650, one, $650_1$, fixed to the stem 630 and the other $650_2$ fixed to the platform 610, close to the rear wheel $620_1$.

Each coupling set 650 comprises attachment means and complementary attachment means, disposed on either side of the longitudinal midplane 605 of the scooter 600 so that two scooters 600 can couple together.

To this end, the attachment means of each coupling set 650 comprise an attachment zone 660 having a male element engaging with a complementary female element of an attachment zone 670 included in the complementary attachment means.

The attachment zones 660 and 670 are similar to the attachment zones 310 and 320 of the previous embodiment, presented particularly in FIG. 3.

In order to be able to be identified, each scooter 600 comprises an NFC tag and an NFC tag reader, in a similar way to the previous embodiment.

Figure 8:
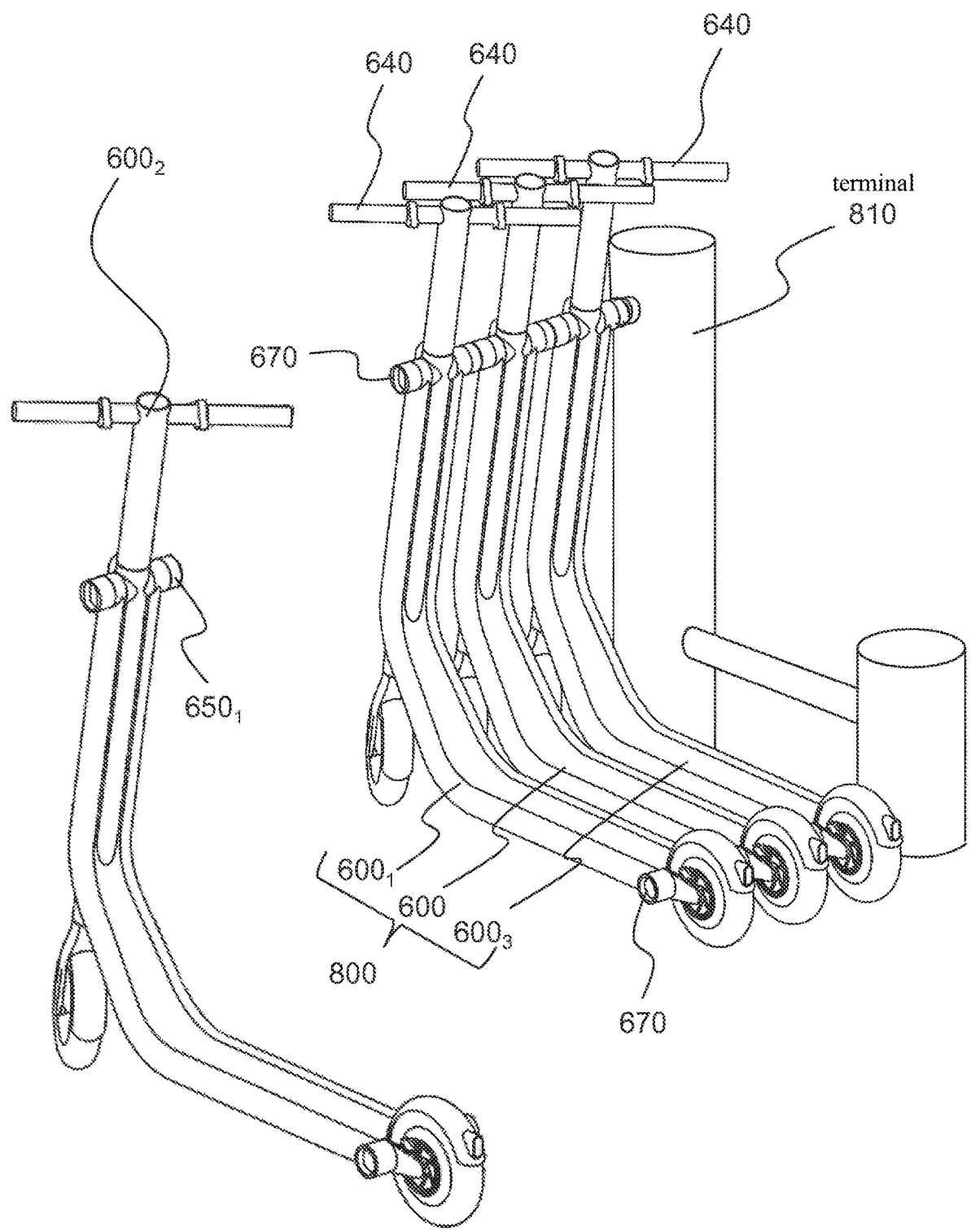
FIG. 8 is a perspective view of a stock of vehicles in FIG. 6.

A perspective view of a set of scooters 600 connected to the chain is presented in FIG. 8. This set 800 of scooters 600 is referred to as a stock.

The stock 800 here comprises three scooters 600 coupled two by two, the scooter $600_1$ at the end of the stock 800.

The stock 800 has in FIG. 8 two free complementary attachment zones 670 so that a fourth scooter $600_2$ can couple to the scooter $600_1$ situated at the free end of the stock 800.

The scooter 600 also comprises an electric motor (not shown in the figure) supplied by a battery (not shown in the figure) in order to propel the scooter 600. In other words, the electric motor is a device assisting the propulsion of the scooter 600.

In order to electrically connect the scooters 600 in the stock 800, the attachment zones 660 and 670 may also comprise electrical connection means for creating an electrical connection between two scooters 600 coupled to each other. The electrical connection means may be similar to those presented in FIG. 3.

Figure 9:
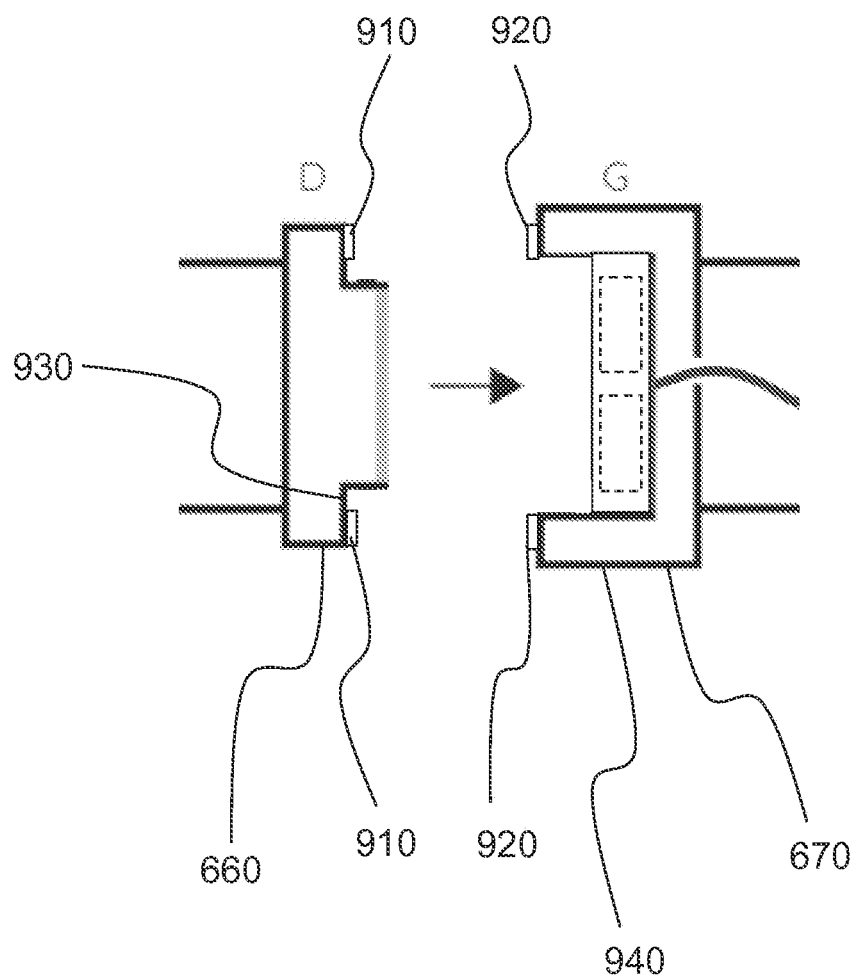
FIG. 9 is a schematic view in cross section of the means of coupling between two vehicles in FIG. 6.

However, in the present non-limitative example, as illustrated in FIG. 9, the electrical connection is simplified by a simple contact between metal fittings 910 and 920 of the attachment zones 660 and 670 of the same coupling set. The metal fittings 910 are in particular situated on the surface of a shoulder 930 presented by the attachment zones 660 and intended to come into abutment with an edge 940 of the female element presented by the complementary attachment zone 670. On the surface of the edge 940 there is situated a metal fitting 920 so that the electrical contact between the fitting 920 and the fitting 910 can be established when two attachment zones 660 and 670 are in contact.

It must be emphasized that the rear coupling set also comprises an electrical connection, making it possible in a first non-limitative example of the invention to connect the electrical masses together.

Figure 10:
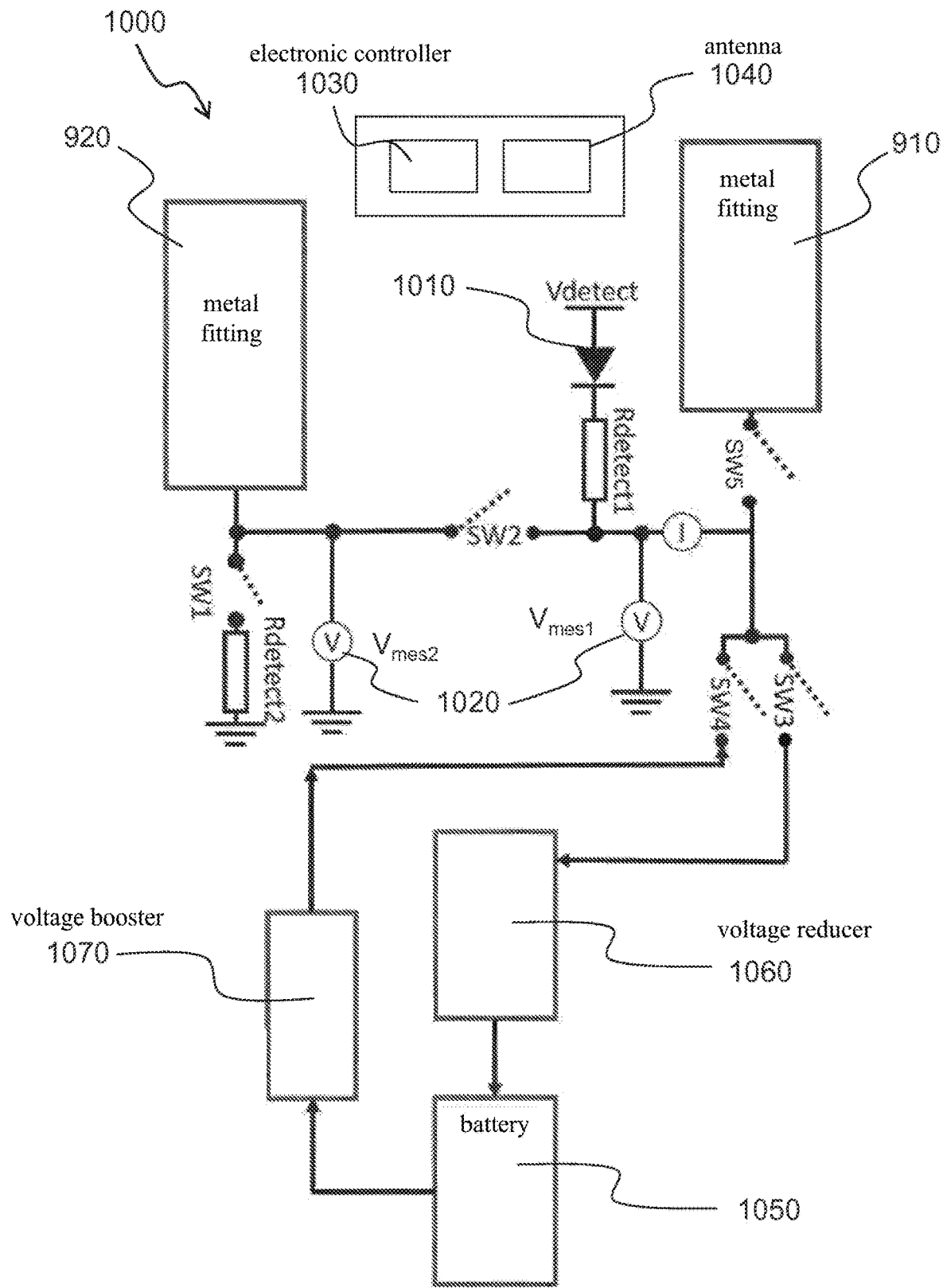
FIG. 10 is a simplified electrical diagram of the vehicle in FIG. 6.

FIG. 10 is a diagram of the electrical circuit 1000 included between the metal fittings 910 and 920 of the coupling set $650_1$ situated at the front of the scooter $600_2$.

The electrical circuit 1000 comprises a plurality of configurations determined by the opening and closing of switches denoted SWX in FIG. 8, where X refers to the number of said switch. The electronic switches SWX are controlled by the electronic module 1030 included in the scooter 600.

By default, the switches SW1 and SW5 are closed and the switches SW2, SW3 and SW4 are open, which is in particular the case when the scooter $600_2$ is not connected to another scooter 600. An electrical supply 1010 applies a voltage $V_{detect}$ to an electrical resistance $R_{detect1}$ of around 100 kohms. Furthermore, a voltmeter 1020 measures the voltage $V_{mes1}$ of the metal fitting 910, corresponding to the right-hand electrode.

When the metal fitting 910 is not connected, the voltage $V_{mes1}$ is equal to $V_{detect}$. The voltage $V_{mes1}$ is modified when the metal fitting 910 is connected to a metal fitting 920 of the scooter $600_1$ in the stock 800 in FIG. 8. This connection creates a divider bridge by connecting $R_{detect1}$ to a resistance $R_{dectect2}$ in the electronic circuit 1000 of the scooter $600_1$. The voltage $V_{mes1}$ induced by the divider bridge created by this connection is then equal to:

$$V_{mes1} = V_{detect} \frac{R_{detect2}}{R_{detect1} + R_{detect2}}$$

The values of the resistances $R_{dectect1}$ and $R_{dectect2}$ are generally of the same order of magnitude, or even equal.

The electronic module of the scooter $600_2$ can thus detect when the scooter $600_2$ is connected to the scooter $600_1$.

Furthermore, the electronic module of the scooter $600_1$ can also detect a connection on the left-hand fitting 920 presented by the free complementary attachment means 670. When the voltage $V_{mes2}$ measured on the left-hand fitting 920 corresponding to the left-hand electrode is zero, the electronic module 1030 deduces from this that no scooter 600 is connected. However, when the voltage $V_{mes2}$ measured on the left-hand fitting is non-zero, the electronic module 1030 of the scooter $600_1$ deduces that a new scooter 600 is connected to the stock 800. In this case the voltage $V_{mes2}$ is also equal to:

$$V_{mes2} = V_{detect} \frac{R_{detect2}}{R_{detect1} + R_{detect2}}$$

It must be emphasized that the switch SW2 on the scooters 600 of the stock 800 is generally closed, except for the scooter $600_1$, where the switch SW2 is open so as to be able to be detected by the scooter $600_2$ and to be able to detect the connection of the scooter $600_2$. As soon as the scooter $600_2$ is coupled to the scooter $600_1$, the switch SW2 on the scooter $600_1$ is closed.

Moreover, the terminal 810 may comprise an electronic circuit comprising at least one resistance $R_{detectB}$ between the metal fitting 1110 and earth, so that the electronic module 1030 of a scooter 600 can detect whether its right-hand fitting 910 is connected to the terminal 810.

Figure 11:
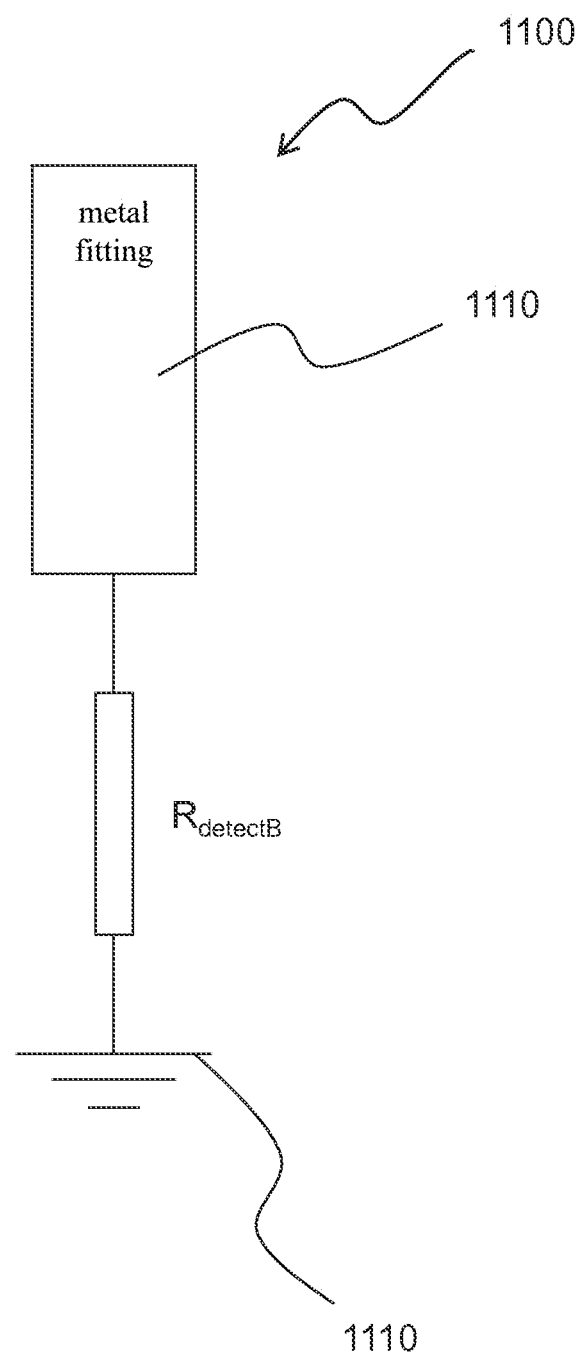
FIG. 11 is a simplified electrical diagram of the terminal in FIG. 9.

An example of such a circuit 1100 is illustrated in FIG. 11, where the resistance $R_{detectB}$ is between the metal fitting 1110 and earth 120. The circuit 1100 corresponds to a terminal 810 without any electrical supply.

The value of the resistance $R_{detectB}$ is generally distinct from $R_{detect2}$ so that the module 1030 of the scooter $600_3$ that is the first to be connected to the terminal 810 can identify that the scooter $600_3$ is coupled to the terminal 810 and not to another scooter 600. However, in some terminal configurations, the value of $R_{detectB}$ is similar or equal to $R_{detect2}$.

Concerning the scooter $600_3$ that is the first to be connected to the terminal 810, as soon as the electronic module 1030 of the scooter $600_3$ has detected that it is connected to the terminal 810, the switch SW5 on the scooter $600_3$ is open if the terminal 810 is not electrically supplied in order to avoid electrical losses. An identification of the terminal 810 can for example be transmitted to the electronic module 1030 by a beacon of the BLE beacon type present in the terminal 810. Such a beacon in particular emits, at regular intervals, a presence signal in accordance with the Bluetooth® standard, which is captured by the antenna 1040 of the scooter $600_3$.

In variants of this particular embodiment of the invention, the switch SW5 is replaced by a wire and the value of the resistance $R_{detectB}$ is greater than $R_{detect2}$. For example, $R_{detectB}$ is around 500 kohms instead of 100 kohms. The value of the resistance $R_{detectB}$ is chosen so that the electric current flowing in the terminal 810 is very low, thus reducing the electrical losses.

When the scooter $600_2$ is connected to the stock 800, an antenna 1040 for receiving a wireless signal to the BLE or Wi-Fi standard of the scooter $600_2$ scans the signals received over a predetermined period, for example over a period of ten milliseconds. For each signal received by the antenna 1040, the electronic module 1030 of the scooter $600_2$ measures the power of the signal received, namely the RSSI (Received Signal Strength Indicator), in order to determine the distance of the scooter 600 from the stock 800. To this end, each scooter 600 of the stock 800 emits a presence signal at regular intervals by means of their antenna 1040. Each presence signal also comprises an identification particular to each scooter 600 in the stock 800.

The electronic module 1030 of the scooter $600_2$ next deduces, from the values of the RSSIs, which scooter 600 is the closest, considering that it corresponds to the signal having the highest RSSI among the signals received. In the present case the closest scooter 600 is the scooter $600_1$.

The scooter $600_2$ also establishes a wireless connection with the scooter $600_1$ via the antennas 1040, exchanging in particular their identifier, which enables the electronic module 1030 of the scooter $600_1$ to know the identifier of the scooter $600_2$.

It must be emphasized that, in the case where the electronic module 1030 of the scooter $600_2$ made a mistake in the identification of the closest scooter 600 in the stock 800, the scooters 600 in the stock 800 can communicate with each other so as to reconstitute the correct order in the stock 800.

In variants of this particular embodiment of the invention, the communication between two scooters 600 connected in series takes place via the use of an NFC (the acronym for the English term near field communication) tag and of an NFC reader, or via the use of an RFID (the acronym for the English term radio-frequency identification) tag and an RFID reader.

When the scooters $600_1$ and $600_2$ have identified the electrical connection between them, the electronic module 1030 of the scooter $600_1$ opens the switch SW1 and closes the switch SW2, thus enabling the scooter $600_2$ to be electrically connected with all the scooters 600 in the stock 800, or even with the terminal 810. A new charging circuit is thus formed.

This new charging circuit comprises all the electronic circuits 1000 of each scooter 600 in the stock 800, which are connected in series. Thus it is possible to transfer the electrical energy gradually by means of an electric current flowing between the electronic circuit 1000 of a scooter 600 and the electronic circuit 1000 of an adjacent scooter 600. In other words, the transfer of energy may be effected between two scooters 600 coupled together, that is to say two consecutive scooters 600 in the stock 800.

It must be emphasized that the scooter $600_2$ leaves the switch SW2 open and the switch SW1 closed in order to be able to detect a connection of another scooter 600.

After the scooter $600_2$ is connected with all the scooters 600 in the stock 800, an electronic module 1030 is chosen as a reference among the electronic modules 1030 in the stock 800. Generally, the reference electronic module 1030 corresponds to the scooter $600_3$ located at the right-hand end of the stock 800, which is, in the present non-limitative example of the invention, connected to the terminal 810.

The reference electronic module receives the information on the state of charge of each battery 1050 in the stock 800 by means of a wireless connection via the antennas 1040.

In variants of this particular embodiment of the invention, the communication is made via a power line (PL).

A selection of the batteries 1050 of the scooters 600 in the stock 800 is made according to the state of charge of each battery 1050 and the position of each scooter 600 with respect to the scooter $600_2$ that corresponds to the free end of the stock 800. It is in fact preferable to charge as a priority the batteries of the scooters $600_1$ and $600_2$ to a sufficient charging level to enable an individual to use them with sufficient range.

However, it may happen that a battery 1050 of the scooters $600_1$ or $600_2$ is sufficiently charged, in which case it is preferable to charge the battery of another scooter 600 in the stock 800. A threshold making it possible to establish whether or not a battery is sufficiently charged can thus be determined.

In the recharging phase, the switches SW3 of the scooters selected for charging are closed while those of the scooters 600 that have not been selected remain open.

An electronic device 1060 for reducing the voltage applied to the terminals of the battery 1050 to be charged may be inserted in the circuit 1000 between the battery 1050 and the switch SW3. Such an electronic device is generally known to persons skilled in the art by the English term "buck charger".

Moreover, the electrical supply to the batteries 1050 to be charged comes either from the terminal 810 when the latter is supplied electrically or from at least one battery 1050 in the stock 800 the charging level of which is sufficient.

For example, if the battery 1050 of the scooter $600_3$ has a higher charge level than the battery 1050 of the scooters $600_2$, the switch SW4 of the scooter $600_3$ will be closed in order to supply the charging circuit in order to recharge the battery 1050 of the scooter $600_2$. Thus the energy of the battery 1050 of the scooter $600_3$ is transferred to the battery 1050 of the scooter $600_2$, passing successively through the electronic circuit 1000 of each scooter 600 in the stock 800. In other words, an electric charging current circulates between the battery 1050 selected as a power source, namely the battery 1050 of the scooter $600_3$, and the battery 1050 selected for charging, namely the battery 1050 of the scooter $600_2$, passing through the electronic circuits 1000 of the scooter 600 lying between the scooters $600_3$ and $600_2$.

In order to avoid line losses, an electronic device 1070 for increasing the voltage at the output of the battery 1050 in order to avoid in particular line losses in the charging circuit. Such a device is generally known to persons skilled in the art by the term "DC/DC boost". Typically, the voltage of a battery the nominal voltage of which is 36 V is around 30 V when it is discharged. When the battery is charged, the voltage thereof is around 42 V. The boost for its part makes it possible to increase the voltage to 50 V.

It should be emphasized that, since the scooter $600_3$ is distant from the free end, the battery 1050 of the scooter $600_3$ can serve to supply the charging circuit in order to recharge the batteries of the scooter 600 that are liable to be used first among the scooters 600 in the stock 800.

Generally, a distance with respect to the free end of the stock 800 is determined, for example equal to three, in order to favor charging of the batteries of the scooters 600 lying in this area, namely among the first three scooters 600 as from the free end of the stock 800.

An individual taking the scooter $600_2$ thus has more chance of having a scooter $600_2$ with sufficient range since the battery 1050 of the scooter $600_2$, which is the first scooter 600 in the stock 800 to be able to be taken by the individual, was recharged as a priority if its charging level was not sufficient.

It must be emphasized that, if the charge level of the battery 1050 of the scooter $600_2$ is sufficient, the battery 1050 of the scooter $600_2$ is not used for recharging other batteries 1050 in the stock 800 in order not to penalize the individual wishing to use the scooter $600_2$.

Figure 12:
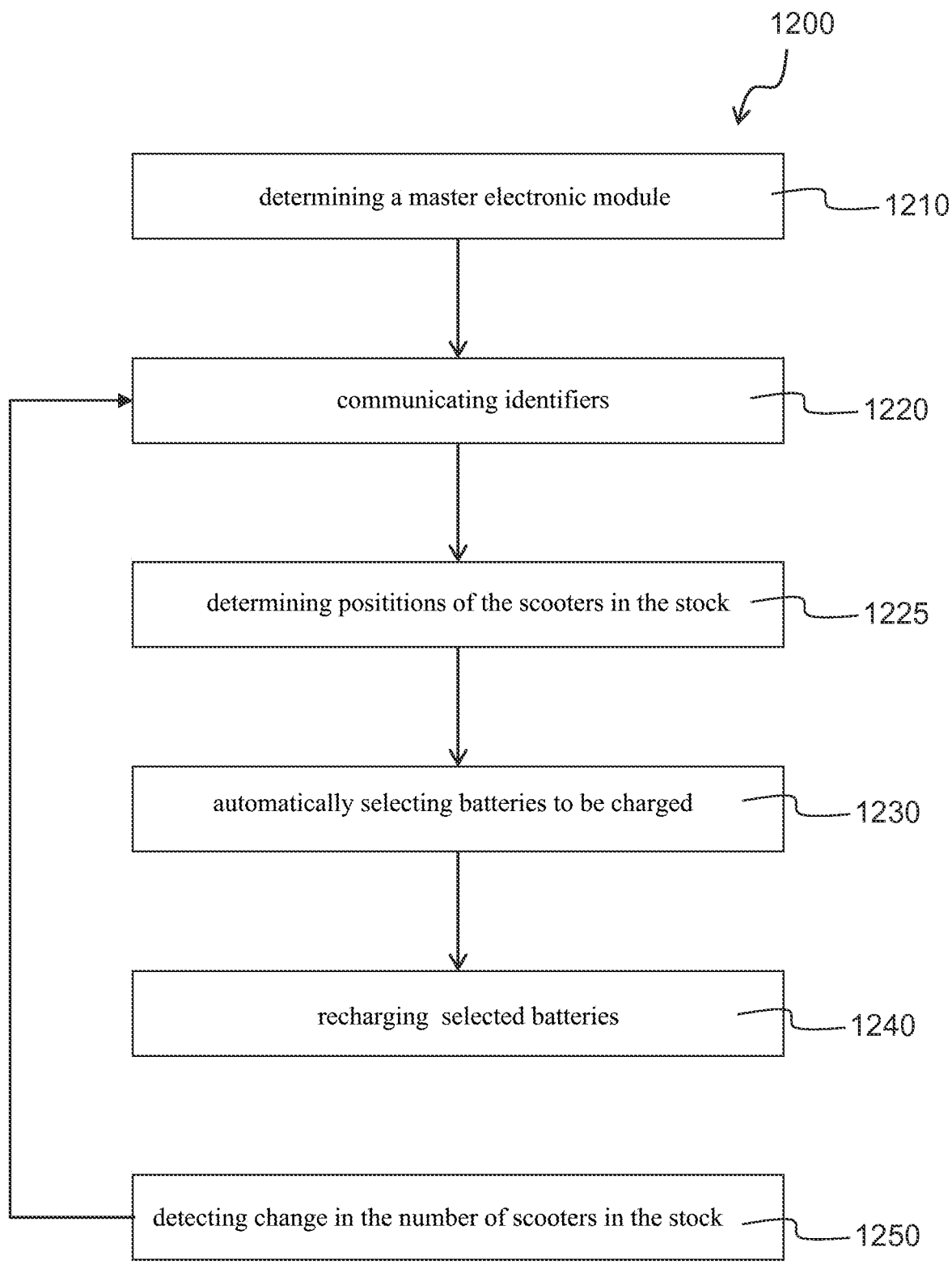
FIG. 12 is a block diagram of a method for recharging all or part of the stock in FIG. 9.

FIG. 12 illustrates, in the form of a block diagram, the recharging method 1200 used in the present non-limitative example of the invention.

The method 1200 comprises a first step 1210 of determining a so-called "master" electronic module among the electronic modules included in the scooters 600 that were detected as being included in the stock 800.

Generally, the electronic module of the scooter $600_3$ that is the first connected to the terminal 810 is considered to be the master module.

The scooters 600 communicate the identifiers to the electronic module known as the master module, as well as the state of their battery 1050 and the name of at least one neighbor, during a second step 1220.

From the identifier of each scooter 600 in the stock and of at least one adjacent scooter 600 for each scooter in the stock, the master module can determine, during the third step 1225, the position of the scooters 600 in the stock 800 with respect to one end of the stock. In other words, the master module determines the order of storage of the scooters 600 with respect to the terminal 810.

The master model can then automatically select, during the fifth step 1230, the batteries 1050 to be charged among the batteries 1050 in the stock 800 according to their state of charge and their position with respect to the free end of the stock 800.

The master module then controls the state of opening and closing of the switches SW3 and SW4 of each scooter 600 in the stock 800 according to the batteries to be charged or even the batteries serving as an electrical supply for charging the other batteries.

The batteries 1050 to be charged are next recharged during the sixth step 1240.

The method 1200 also comprises a sixth step 1250 of detecting a change to the number of scooters 600 in the stock. This change may correspond to the addition or removal of a scooter on the free side of the stock 800. As soon as an addition is detected, the method 1200 updates the selection of the batteries to be charged, recommencing at step 1220.

It must be emphasized that this step 1250 may be performed at any time in the method 1200.

It must be emphasized that, since the master module is generally defined as being the one on the scooter $600_3$ attached to the terminal 810, the master module in the stock 800 is unchanged as long as the scooter $600_3$ is not detached from the terminal 810.

The invention claimed is:

1. A method for recharging an electrical energy storage device of all or some of a plurality of vehicles connected to a chain, all of the plurality of vehicles connected to the chain being referred to as a stock, each vehicle comprising an electronic circuit connected to the electrical energy storage device, each vehicle comprising a microcontroller, the method comprising:

selecting and recharging at least one electrical energy storage device with an electric current circulating between the electronic circuits of at least two consecutive vehicles among the plurality of vehicles in the stock;

communicating to a master microcontroller or to a remote server a list of the plurality of vehicles in the stock and a charging state of the electrical energy storage device of said each vehicle in the stock, the master microcontroller being determined among the microcontrollers of the plurality of vehicles in the stock or in a terminal connected to the stock;

wherein said at least one electrical energy storage device to be charged is automatically selected according to a position of said each vehicle with respect to a reference vehicle in the stock and the charging state of the electrical energy storage device in said each vehicle; and wherein a number of electrical energy storage devices selected to be charged is restricted to a predetermined number, the electrical storage devices selected to be charged having a charge level below a predetermined threshold, and situated at a predetermined distance from the reference vehicle located at one end of the stock.

2. The method of claim 1, wherein the electronic circuits are connected in series.

3. The method of claim 1, further comprising coupling the plurality of vehicles in the stock to each other, said each vehicle comprising an attachment zone and a complementary attachment zone, the attachment zone of a first vehicle being configured to electrically connect to the complementary attachment zone of a similar second vehicle or a terminal.

4. The method of claim 1, further comprising:

communicating by the master microcontroller of a command to the microcontrollers of said each vehicle in the stock to connect said at least one electrical energy storage device selected to a charging circuit connected to a power supply and to disconnect other electrical energy storage devices in the stock not selected from the charging circuit.

5. The method of claim 4, further comprising communicating to the master microcontroller, positions of the plurality of vehicles in the stock with respect to a reference vehicle in the stock or a terminal.

6. The method of claim 4, further comprising communicating to the master microcontroller of at least one neighbor for said each vehicle in the stock; and determining positions of the plurality of vehicles in the stock with respect to a reference vehicle in the stock or the terminal.

7. The method of claim 4, wherein the plurality of vehicles in the stock is connected to a terminal, the terminal is connected an electrical supply and comprises a microcontroller; and wherein the master microcontroller is determined from among the microcontrollers included in the plurality of vehicles in the stock and the terminal.

8. The method of claim 4, further comprising coupling the plurality of vehicles in the stock to each other, said each vehicle comprising an attachment zone and a complementary attachment zone, the attachment zone of a first vehicle being configured to electrically connect to the complementary attachment zone of a second vehicle or a terminal; and wherein the microcontroller of the first vehicle in the stock detects the coupling of the second vehicle in the stock to the attachment zone of the first vehicle, identifies the second vehicle and establishes a connection with the second vehicle over a communications network.

9. The method of claim 8, wherein the connection is a wireless connection via a wireless communication protocol.

10. The method of claim 1, further comprising detecting a change in a number of vehicles in the stock; and updating the selection of said at least one electrical energy storage device to be charged.

11. The method of claim 1, wherein the plurality of vehicles is electric bicycles or scooters, said each vehicle comprising a device assisting propulsion of said each vehicle.

12. The method of claim 1, wherein the stock comprises at least one battery to recharge said at least one selected energy storage device.

13. The method of claim 1, further comprising:

detecting an electrical connection of a first vehicle in the stock to a second vehicle, by an electronic module of the first vehicle in the stock;

establishing a wireless connection between the first vehicle in the stock and the second vehicle, and exchanging identifiers of the first and second vehicles; and establishing a list of relative positions of the plurality vehicles in the stock with respect to a free end of the stock, and of the charging state of the electrical energy storage device of each vehicle in the stock.

\* \* \* \* \*